(12) United States Patent
Mata et al.

(10) Patent No.: US 11,485,072 B2
(45) Date of Patent: Nov. 1, 2022

(54) SELECTIVE LASER SINTERING OF ASYMMETRIC PARTICLES

(71) Applicant: Depuy Synthes Products, Inc., Raynham, MA (US)

(72) Inventors: Mario Mata, Paoli, PA (US); Kristin Kita, Philadelphia, PA (US); Dana Coombs, Harleysville, PA (US)

(73) Assignee: DePuy Synthes Products, Inc., Raynham, MA (US)

( * ) Notice: Subject to any disclaimer, the term of this patent is extended or adjusted under 35 U.S.C. 154(b) by 1053 days.

(21) Appl. No.: 16/160,751

(22) Filed: Oct. 15, 2018

(65) Prior Publication Data

US 2019/0126539 A1 May 2, 2019

Related U.S. Application Data

(60) Provisional application No. 62/578,119, filed on Oct. 27, 2017.

(51) Int. Cl.
*B29C 64/153* (2017.01)
*D01D 5/00* (2006.01)
(Continued)

(52) U.S. Cl.
CPC ............ *B29C 64/153* (2017.08); *B29B 7/90* (2013.01); *B33Y 10/00* (2014.12); *B33Y 70/00* (2014.12);
(Continued)

(58) Field of Classification Search
CPC ......... B29C 64/153; B29B 7/90; B33Y 10/00; B33Y 70/00; B33Y 80/00; D01D 5/0023; D01D 5/003; B29K 2101/12
See application file for complete search history.

(56) References Cited

U.S. PATENT DOCUMENTS

| 6,136,948 A | 10/2000 | Dickens, Jr. et al. |
| 9,321,192 B2 | 4/2016 | Corriol et al. |

(Continued)

FOREIGN PATENT DOCUMENTS

| DE | 2125275 A1 | 11/1972 |
| WO | 2016/092106 A1 | 6/2016 |

OTHER PUBLICATIONS

"Notification of Transmittal of the International Search Report", and the Written Opinion of the International Searching Authority, or the Declaration issued in PCT/US2018/056964 dated Feb. 11, 2019.

(Continued)

*Primary Examiner* — Rick K Chang
(74) *Attorney, Agent, or Firm* — Kramer & Amado, P.C.

(57) ABSTRACT

A polymeric article of high ductility produced by rapid prototyping or selective laser sintering, and a method of making the same. The article comprises a plurality of layers of a fused thermoplastic powder, the thermoplastic powder comprising asymmetric fibrous particles having a mean length L and a mean width W, wherein L>2 W. Within each of the layers, the mean length L of the asymmetric fibrous particles is preferentially oriented in a plane parallel to the layer. The polymeric article has a stress-strain curve such that ultimate strength is reached at a strain of 10% to 20%, and breaking stress is reached at >30% strain.

23 Claims, 7 Drawing Sheets

(51) Int. Cl.
  *B33Y 10/00*   (2015.01)
  *B33Y 70/00*   (2020.01)
  *B29B 7/90*    (2006.01)
  *B33Y 80/00*       (2015.01)
  *B29K 101/12*      (2006.01)

(52) U.S. Cl.
  CPC ........... *D01D 5/003* (2013.01); *D01D 5/0023* (2013.01); *B29K 2101/12* (2013.01); *B33Y 80/00* (2014.12)

(56) References Cited

U.S. PATENT DOCUMENTS

| | | |
|---|---|---|
| 9,587,107 B2 | 3/2017 | Bertelo et al. |
| 2009/0295042 A1 | 12/2009 | Pfister et al. |
| 2014/0050921 A1 | 2/2014 | Lyons et al. |
| 2014/0271328 A1 | 9/2014 | Burris et al. |
| 2015/0259530 A1 | 9/2015 | Rodgers et al. |
| 2018/0272613 A1* | 9/2018 | Cieszynski ............. B22F 10/20 |

OTHER PUBLICATIONS

Kalfon-Cohen, et al., "Annealing of drawn monofilaments of liquid crystalline polymer vectra/vapor grown carbon fiber nanocomposites", Polymer 51 (2010) 1033-1041.

Youssef, "Additive manufacturing of polymer melts for implantable medical devices and scaffolds", Biofabrication 9 (2017) Jan. 2002—https://doi.org/10.1088/1758-5090/aa5766.

* cited by examiner

SELECTIVE LASER SINTERING OF ASYMMETRIC PARTICLES

CROSS REFERENCE

This application claims the benefit of U.S. Provisional Patent Application No. 62/578,119, titled "SELECTIVE LASER SINTERING OF ASYMMETRIC PARTICLES", filed Oct. 27, 2017.

TECHNICAL FIELD

Various exemplary embodiments disclosed herein relate generally to selective laser sintering of asymmetric particles to produce a three-dimensional article with improved ductility.

BACKGROUND

Selective laser sintering (SLS) of polymer powders is becoming an increasingly important method of manufacturing porous articles, including implantable medical articles with pores suitable for tissue ingrowth. However, the range of polymers commonly used for SLS is restricted. Polyamide 11 and polyamide 12 (melting point: 178-187° C.) have been used with some success, as well as a few exotic polymers. These exotic polymers include polyetherketone polymers, thermoplastic urethane polymers, and polyether polyamide block copolymers. Attempts have been made to identify alternative polymers for SLS. Polybutylene terephthalate was found to exhibit warpage and cracking in SLS processes, and has a high melting (melting point ~223° C.). Polyoxymethylene also exhibited significant warpage on SLS processing. Some success was obtained with polyethylene and polypropylene powders. There is a need in the art for biodegradable and bioresorbable polymer powders which may be fabricated into dimensionally accurate medical articles by SLS, without cracking or warping under stress.

Poly(caprolactone) and other aliphatic polyesters; aliphatic polyamides; polyolefins; low-melting aliphatic polycarbonates, acrylic polymers, acetal polymers, and low-melting styrenic block copolymers have been used in manufacturing articles by selective laser sintering. However, the particles used in selective laser sintering are typically roughly spherical or irregular particles of low aspect ratio, where the particle diameter in its longest dimension is less than twice the particle diameter in its shortest dimension.

During selective laser sintering, such generally spherical particles are deposited on the bed of a 3D printer, and a laser is used to soften the particles and produce a first layer of an article from bonded particles. A second layer of particles are then deposited on the bonded first layer, and the laser is used to soften the particles in the second layer, fusing them both to each other and to the first bonded layer. This is continued until the article is complete. The result is a generally rigid three-dimensional article, where the particles in each layer are fused to each other and to particles in adjacent layers, forming a rigid three-dimensional network. When subjected to stress from elongation, compression, or shear forces, the article is unable to bend or flex, and is likely to crack or break.

There is a need in the art for selective laser sintering processes which produce three dimensional articles with improved ductility, which are resistant to cracking and breaking. Ductile articles produced by 3D printing with biocompatible and/or bioresorbable polymer powders, i.e., polylactones and polylactides, are of particular interest, as they would be particularly suitable for preparation of implantable medical devises by selective laser sintering.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

In various embodiments, a polymeric article of high ductility is produced by rapid prototyping. The article comprising a plurality of layers of a fused thermoplastic powder. The thermoplastic powder comprises asymmetric fibrous particles. The asymmetric particles may be characterized by scanning electron microscopy, particle size distribution, and/or a mean length L and a mean width W, wherein $L > 2W$; $L > 5W$; or $L > 10W$. In various embodiments, $2W < L < 100W$; $2W < L < 50W$; or $4W < L < 10W$. The asymmetric particles may comprise a mixture of particles having different aspect ratios. For example, particles which are blocky and have an aspect ratio such that $2W < L < 4W$ may be used in combination with particles which are narrow and have an aspect ratio such that $10W < L < 100W$. Each of the layers is characterized in that the asymmetric fibrous particles are preferentially oriented in a plane parallel to the layer, so that the asymmetric particles in each layer form a generally two-dimensional network. Asymmetric fibrous particles within each layer are bonded together by laser sintering.

The layers in the polymeric article of high ductility thus have a high degree of bonding between the particles within the layer, due to the thermal effect of laser sintering. This forms a network of bonded fibers in each layer. The fibrous network within each layer leads to increased ductility/stretchability along a direction parallel to the layers of the fused thermoplastic powder. The polymeric article has a stress-strain curve when stretched in the x-y plane, such that ultimate strength is reached at a strain of 10% to 20%, and breaking stress is reached at >30% strain, >40% strain, or >50% strain.

In various embodiments, the polymeric article of high ductility is produced by rapid prototyping of a fused thermoplastic powder, where the thermoplastic powder is a thermoplastic polyester, a thermoplastic polyolefin, a polyamide, a polycarbonate, an acrylic polymer, or a styrenic block copolymer. If the thermoplastic powder is a thermoplastic polyester, the polyester may be a polylactone, a polylactic acid, an aliphatic polyester of an aliphatic diacid and an aliphatic diol, or a mixture thereof. If the thermoplastic powder is a thermoplastic polyolefin, the polyolefin may be a polymer or copolymer of ethylene, propylene, n-butylene, or isobutylene. Alternatively, the thermoplastic powder may be a polyamide, such as polyamide 11, polyamide 12, polyamide 6, polyamide 4.6, polyamide 6.6, a copolymer thereof, or a mixture thereof. The thermoplastic powder may also be a thermoplastic polyurethane, a polycarbonate-based urethane, or a cyanate ester resin.

The current disclosure also describes a method of creating a polymeric article of high ductility by selective laser sintering, by depositing a first layer of thermoplastic powder comprising asymmetric fibrous particles having a mean length L and a mean width W, wherein $L > 2W$, $L > 5W$, or L>10 W on a bed of a 3D printer, so that the mean length L of the asymmetric fibrous particles being preferentially oriented in a plane parallel to the bed; and fusing the thermoplastic powder with a laser in selected portions of the layer to produce an initial cross section of the polymeric article.

A further layer of thermoplastic powder comprising the asymmetric fibrous particles is deposited on the first layer, so that the mean length L of the asymmetric fibrous particles in the second layer is preferentially oriented in a second plane parallel to the bed. The asymmetric powder in selected portions of the further layer is fused with a laser to produce a further cross section of the polymeric article, bonded with the initial cross section. This process is repeated until the polymeric article is complete. In various embodiments, the polymeric article is created using a thermoplastic powder comprising asymmetric fibrous particles of a thermoplastic polyester, a thermoplastic polyolefin, a polyamide, a polycarbonate, an acrylic polymer, or a styrenic block copolymer.

Asymmetric fibrous particles suitable for selective laser sintering may be produced by subjecting thermoplastic polymer particles having a glass transition temperature Tg to a shear force at a temperature T, where T is greater than Tg, but less than the melting point Tm (Tg<T<Tm); less than 100° C. above Tg (Tg<T<[Tg+100° C.]); less than 50° C. above Tg (Tg<T<[Tg+50° C.]); or less than 10° C. above Tg (Tg<T<[Tg+10° C.]). The shear force is sufficient to draw at least a portion of the thermoplastic polymer particles into asymmetric fibrous particles. The shear force may be applied by subjecting the particulate thermoplastic polymer to milling, where milling may be carried out using a three roll mill, a rotor/stator mill, a pin mill, a jet mill, or a hammer mill.

Alternatively, asymmetric fibrous particles suitable for selective laser sintering may be produced by electrospinning a solution of a polymer through an applied voltage to produce nanofibers having a defined mean nanofiber length $L_1$. If the nanofiber length $L_1$ is greater than a desired fibrous particle length L, the nanofibers may be fractured to reduce their length. The nanofibers may be fractured by grinding; milling; or cutting, directly or after immersion in liquid nitrogen. Sonication with ultrasound has also been used to mechanically break nanofibers into short strands in the microns length.

Alternatively, polymer nanofibers having the desired fibrous article length L may be produced directly by controlling electrospinning conditions. The lengths of the nanofibers may be reduced by increasing applied voltage during the electrospinning step; or increased by increasing the flow rate of the polymer solution through the applied voltage. The lengths of the nanofibers may also be reduced by adding nano- or microparticles (up to about 2 microns in diameter) to the polymer solution.

BRIEF DESCRIPTION OF THE DRAWINGS

In order to better understand various exemplary embodiments, reference is made to the accompanying drawings, wherein:

FIG. 1 shows larger particles (~60 micron average particle size) recovered by the mesh on the left hand side ("On Screen"); and fine particles passed through the screen ("Through Screen"). The larger particles recovered by the mesh are used for selective laser sintering.

DETAILED DESCRIPTION

Figure 1:
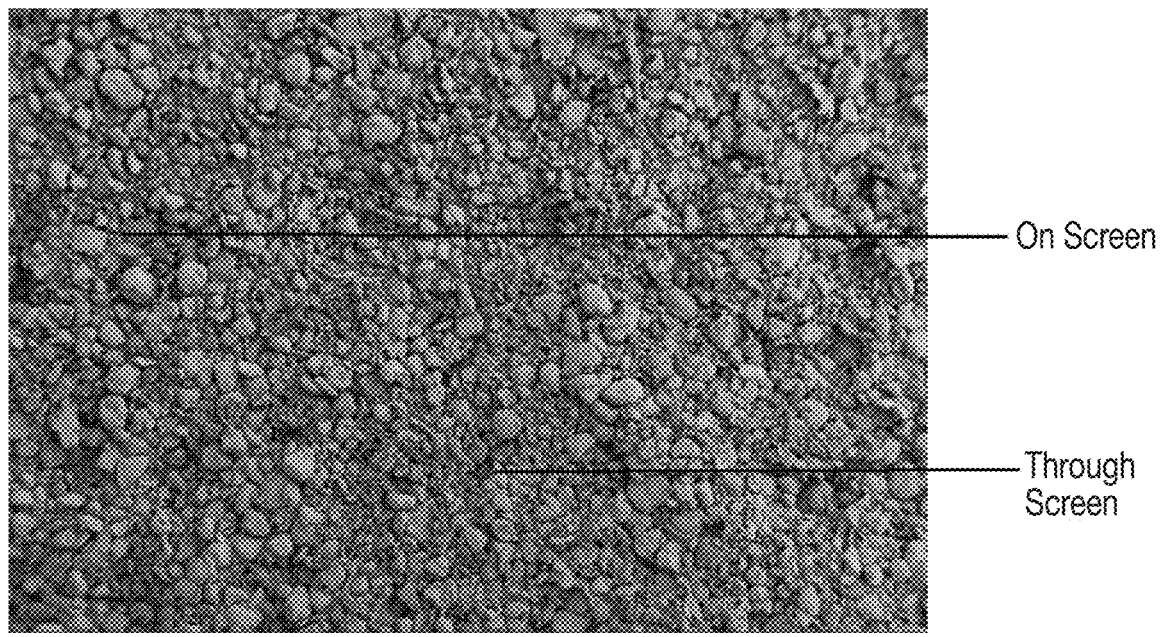
FIG. 1 shows two populations of conventional polycaprolactone particles, sorted with a 140 mesh screen. These particles have a Tg of −60° C., and are roughly spherical, with each particle having a maximum particle diameter D1 and a minimum particle diameter D2. The mean ratio of D1:D2 is between 1:1 and 1:2.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

"Glass transition temperature," or $T_g$, as used in the present disclosure, refers to the temperature at which an amorphous solid undergoes a transition from a hard, brittle state into a viscous state. The glass transition temperature may be identified by a change in heat flow during a solid/solid phase transition, as measured by differential scanning calorimetry (DSC).

"Stress," or σ, as used in this application, is a measure of force per unit area. Stress is the ratio of an applied force P to an initial cross sectional area $A_o$ of an article ($\sigma = P/A_o$).

"Strain," or ε, as used in this application, is a measure of an article's elongation under stress. Strain refers to the ratio of increase in length of the neck divided by the initial length of the article ($\varepsilon = [L_f - L_o]/L_o$).

A "stress-strain curve," as used in this application, shows how an article responds to applied stress. Key features defined by the stress-strain curve include:

The proportionality limit M;

The elastic modulus, as defined by either a) the slope of the linear segment between B and M; or b) the ratio of stress to strain at M;

The offset yield strength OY, measured at an offset yield point of 0.2% plastic strain;

The ultimate strength P; and

The break point F. As the strain increases from the ultimate strength P to the break point F, an elastic or ductile article may undergo irreversible elongation, or "necking"; while an inelastic article may simply break.

"Sintering," as used in the present disclosure, refers to forming a solid mass of material by heating particulate material without melting the material. During sintering, diffusion of polymer chains across particle boundaries fuses the particles together and forms a solid article. Sintering may be carried out at a temperature between the onset temperature for polymer crystallization and the melting point of the polymer.

"Selective laser sintering", or SLS, as used in the present disclosure, refers to an additive manufacturing technique that uses a laser as the power source to heat a powdered polymer material to the point of sintering. SLS aims the laser under computer control in a layer-by-layer manner at a layer of polymer powder in areas corresponding to a cross section of a 3D model, binding the polymer powder together to create a solid structure. After laser sintering of a first cross sectional layer, additional powder is deposited on the sintered layer and a second layer is created by laser sintering of a second cross section of the model. This process is continued until a complete structure corresponding to the 3D model is produced.

Polymers which may be used in the process disclosed herein solid polymers having a glass transition temperature between −100° C. and 70° C.; between −70° C. and 50° C.; −60° C. and 25° C.; or −60° C. and 0° C. Table 1 below provides a listing of polymers which may be used in this process.

In various embodiments, polymers are provided in the form of spherical or irregular particles of low aspect ratio, as shown in FIG. 1. The aspect ratio may be determined by measuring the ratio of a mean particle size in the longest dimension (particle length), to a mean particle size perpendicular to the largest dimension (particle width). In various embodiments, polymers are provided in the form of spherical particles (aspect ratio ~1:1) or irregular particles having an aspect ratio of between about 1:1 and about 2:1. In various embodiments, the spherical or irregular particles are milled under conditions of high shear. The step of milling may be carried out with a three roll mill or a rotor/stator mill.

TABLE 1

Polymers Useful for Preparing Asymmetrical Fibrous Particles.

| Polymer | Tg (° C.) |
|---|---|
| poly(acetaldehyde) | −32 |
| poly(1-butene) | −24 |
| polyisobutylene | −73 |
| poly(butyl acrylate) | −54 |
| polycaprolactone | −60 |
| poly(dodecyl acrylate) | −3 |
| poly(dodecyl methacrylate) | −65 |
| Poly(ethylene adipate) | −46 |
| poly(ethylene malonate) | −29 |
| poly(ethylhexyl acrylate) | −50 |
| poly(ethylhexyl methacrylate) | −10 |
| poly(ethyl vinyl ether) | −43 |
| poly(formaldehyde) | −82 |
| poly(glycolic acid) | 35 to 40 |
| polypropylene | −13 to −8 |
| Nylon 4,6 | 43 |
| Nylon 6 | 52 |
| Nylon 6,6 | 50 |
| Nylon 6,10 | 50 |
| Nylon 11 | 42 |
| Nylon 12 | 41 |
| polylactide | 60 |

The preferred mills grind particles between two surfaces in motion relative to each other. In a three roll mill, a paste comprising the polymer particles is fed between rolls moving in opposite directions at different speeds; this subjects the particles in the paste to very high shear force. Alternatively, five roll mills or mills involving shear between a roll and a stationary surface may be used. In a rotor/stator mill, a paste or dispersion of polymer particles is subjected to high shear between a moving rotor or impeller, and a stationary component known as a stator. Impact mills, including hammer mills, pin mills, and jet mills, may also be used.

In various embodiments, the step of shearing the particles is carried out at a temperature exceeding the glass transition temperature Tg of the polymer, but no more than the melting point Tm of the polymer. For example, the step of shearing the particles may be carried out at a temperature of Tg+1° C. to Tg+10° C.; Tg+2° C. to Tg+8° C.; or Tg+3° C. to Tg+6° C. If the step of shearing the particles is carried out in the disclosed temperature range, the particles become amorphous and elastic, and stretch in the direction of shear, producing elongated particles. If the step of shearing the particles is carried out below Tg, the particles are brittle and glassy, and are prone to fragment or break into smaller particles under shear, without stretching. If the step of shearing the particles is carried out above the Tm, the particles may undergo viscoelastic flow and stick together.

Figure 2:
FIG. 2 shows a population of polycaprolactone particles prepared by milling the 60 micron polycaprolactone particles of FIG. 1 at a temperature T, where Tg<T<(Tm). These particles are asymmetrical, with particles having a mean particle width W and a mean particle length L. The mean ratio of L:W is >5:1.

As a result of shearing, the particles stretch and the mean particle length:width ratio increases from an initial ratio between 1:1 and 2:1 to a final ratio of from 2:1 to 50:1; from 4:1 to 25:1; or from 5:1 to 10:1; particle morphology may be directly observed by means of scanning electron microscopy (SEM), as shown in FIG. 2. The population of particles observed by SEM in FIG. 2 contains asymmetric elongated particles, while particles which have not been subjected to shear are shown by SEM to be roughly spherical, as shown in FIG. 1. The final ratio is >2:1, >5:1, >10:1, or >20:1. The particles may also be defined in terms of a particle size distribution, based on particle length, particle width, or both particle length and width. The final milled particles may comprise a population of elongated particles with a variety of shapes, as shown in FIG. 2. A portion of the milled particles may form short fibers with a length:width ratio of >10:1. A portion of the milled particles may form elongated blocky particles with a length:width ratio of between 2:1 and 5:1. Finally, some particles may be irregular in shape, including a polymer fiber and a polymer bead connected to at least one end of the polymer fiber. As seen in FIG. 2, the elongated milled particles may be deposited in a bed of a 3D printer, so that the long dimension of the fibrous particles is oriented in an x-y plane, parallel to the bed of the printer. The elongated milled particles may then be laser sintered to produce a two dimensional network of connected fibers.

Unlike a layer of roughly spherical bonded particles, as shown in FIG. 1, the two dimensional network of fibers elongates when subjected to a force parallel to the x-y plane. An article produced by selective laser sintering of a sequence of such layers of elongated milled particles has improved ductility or stretchability, compared to an article produced by selective laser sintering of a sequence of layers of conventional particles.

In various embodiments, polymers may be provided in the form of short nanofibers produced by electrospinning. Electrospinning involves applying a high voltage to a liquid droplet of a polymer solution to produce a liquid jet. As the jet dries in flight, polymer fibers are produced and deposited on a grounded collector. The resulting fibers have nanometer-scale diameters. Aspect ratio of the resulting fibers (ratio of length to width) may be controlled in a number of ways. Use of high molecular weight polymers in electrospinning leads to polymer chain entanglement; this causes greater cohesion in the liquid jet and produces longer fibers. Low molecular weight polymers are less entangled in the liquid jet, allowing the jet to break up into shorter fibers. Also, as the polymer concentration increases, the fiber morphology changes from particulate at low concentration, to longer fibers at higher concentrations. Addition of microparticles to the polymer solution reduces the length of fibers produced by electrospinning.

If fibers produced by electrospinning have an aspect ratio of length to width which is larger than desired, e.g., larger than 100:1, for example, the fibers may be shortened by a number of processes. Grinding, milling, or cutting may be used to shorten electrospun fibers. Also, sonication with ultrasound may be used to shorten electrospun fibers.

Particles produced from electrospun fibers, after shortening to a desired length, are generally have a comparatively high mean aspect ratio of between 20:1 and 100:1, or between 30:1 and 80:1, or between 40:1 and 60:1. Milled asymmetric particles have a mean aspect ratio of between 2:1 and 50:1, between 4:1 and 20:1, or between 5:1 and 10:1; in some embodiments, milled particles are on average shorter and/or thicker than particles produced by electrospinning, i.e., they have a lower aspect ratio.

Particles produced by electrospinning may be deposited on a bed of a three-dimensional printer, so that electrospun fibers are preferentially oriented in the x-y-plane. The oriented particles of high aspect ratio may be bonded by selective laser sintering to form a loose two-dimensional network of bonded fibers. Particles of lower aspect ratio produced by milling may also be deposited on a bed of a three-dimensional printer, so that the milled particles are preferentially oriented with their longest dimension in the x-y plane. Upon selective laser sintering, the milled particles may be bonded to form a two-dimensional network of bonded particles. The polymeric articles prepared in this manner may have an ultimate strength of between 8 MPa and 15 MPa, and an elongation at ultimate strength of 12% to 18%.

In various embodiments, combinations of various particles may be used to vary the ductility and other physical properties of the finished article. For example, asymmetric fibrous particles may be mixed with spherical particles in varying amounts to generate finished articles with customizable properties. Asymmetric fibrous particles may be mixed with spherical particles in a ratio of between 10:1 and 1:10; between 8:1 and 1:8; between 6:1 and 1:6; between 4:1 and 1:4; or between 2:1 and 1:2. Among the asymmetric particles, milled particles may be mixed with electrospun fibers in varying amounts to manipulate the ductility of the finished articles. Asymmetric particles and spherical particles, as well as different types of asymmetric particles, may also be alternated among the layers of the article during selective laser sintering.

Ductile articles produced in this manner may be used in a variety of fields. However, medical applications are of particular interest. The asymmetric fibrous particles may be used to produce replacements for bones and teeth, which may be implanted in a patient. These replacements have higher ductility than conventional bone replacements, and are less prone to breakage under stress. Bones that may be constructed by selective laser sintering include craniomaxillofacial bones, including the mandible; long bones in the arms or legs; replacement ribs and/or a replacement sternum; and cages for spinal fusion. In some, as in cages for spinal fusion, the replacement parts may be made out of a bioresorbable polymer, such as polycaprolactone or polylactide, which will be replaced with natural bone. Where appropriate, a biocompatible non-resorbable polymer may be used.

Use of asymmetric fibrous particles for preparation of a medical implant, e.g., a spinal fusion cage, produces an article with a network of bonded fibers. This network creates porosity in the article. Additionally, asymmetric fibrous particles produce a surface which is roughened or microtextured; this microtextured surface arises from fibers extending beyond the article surface. Porosity from the network of bonded fibers and the microtextured surface may promote tissue ingrowth. Medical implants produced from conventional spherical particles have a structure made of tightly bound particles, and a smoother surface; such implants may be less able to promote tissue ingrowth.

EXAMPLES

In the following examples, polycaprolactone particles were used to produce articles by selective laser sintering. The articles produced by laser sintering correspond to the dogbone-shaped article 1 of FIG. 3A, where article 1 has a diameter of 3 mm; and a neck diameter of 1.8 mm with a neck length $L_o$ of 15.8 mm (neck cross sectional area $A_o$=2.54 $mm^2$).

The examples use two types of polycaprolactone particles (Tg=−60° C.), conventional irregularly shaped particles of FIG. 1, and asymmetric fibrous particles of FIG. 2, produced by milling the particles of FIG. 1 in a rotor/stator mill at a temperature of −55° C.

Example 1

Selective Laser Sintering with Conventional Particles

Figure 3A:
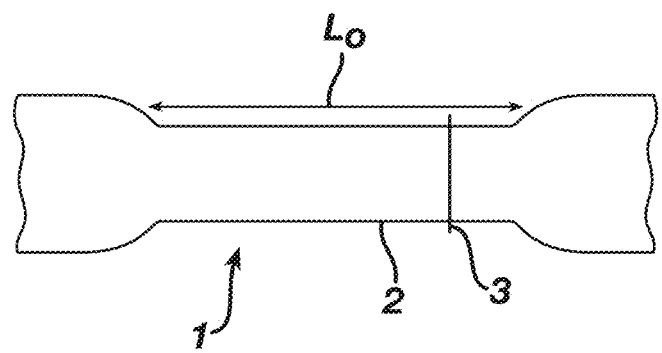
FIG. 3A shows a "dogbone-shaped" article 1, with a neck 2; the neck has length $L_o$ and a cross sectional area $A_o$ of neck 2 in a plane 3, perpendicular to the length of the article.

A dogbone-shaped article 1 of FIG. 3A was prepared by selective laser sintering, using the irregularly shaped polycaprolactone particles of FIG. 1. The polycaprolactone particles had a glass transition temperature (Tg) of −60° C., and a mean particle size of 60 microns. A first powder layer was deposited at a layer thickness of 100 microns, and sintered by scanning a laser over an area corresponding to a cross section of the desired article, where the area is defined by an edge. A second powder layer was deposited and sintered by scanning the laser over an area corresponding to a second cross section of the article; this process is completed until the complete dogbone-shaped article is formed.

Example 2

Figure 3B:
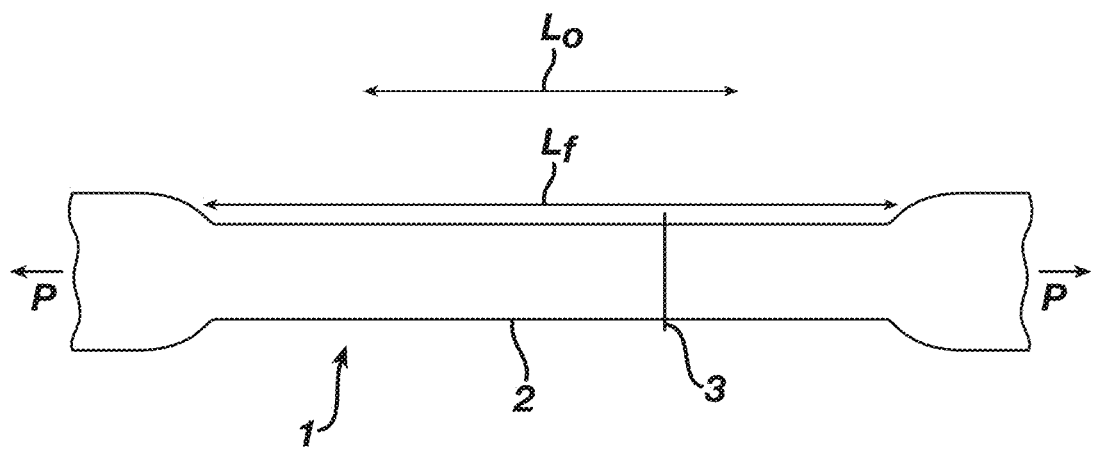
FIG. 3B is the "dogbone-shaped" article of FIG. 3A, after application of force P to the article, increasing the length $L_o$ to a final length $L_f$.
Figure 4A:
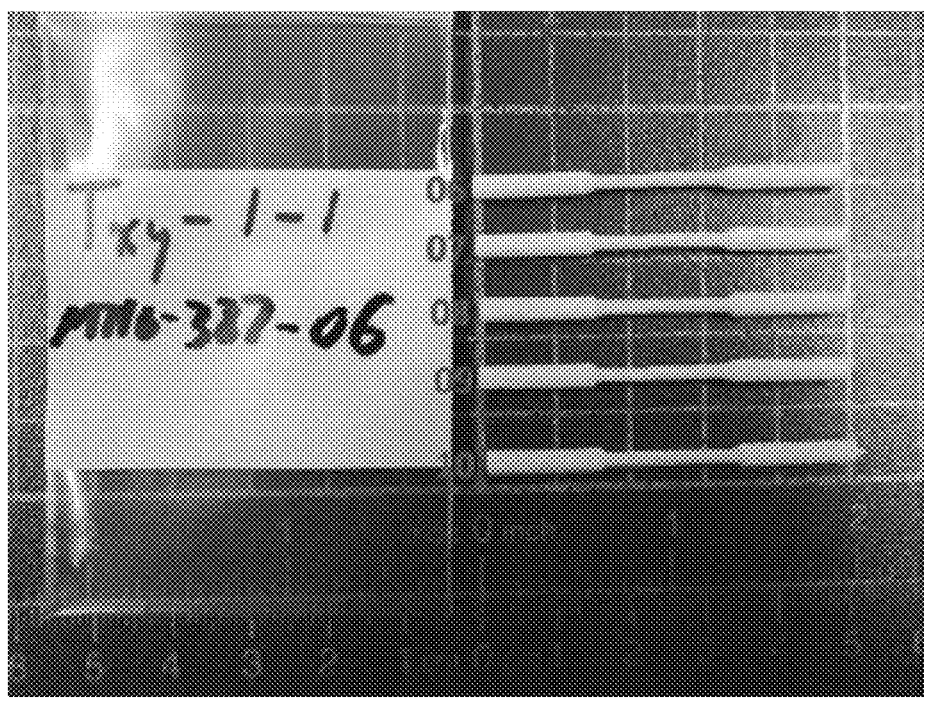
FIG. 4A shows a dogbone-shaped article prepared by selective laser sintering of the 60 micron polycaprolactone particles of FIG. 1.
Figure 4B:
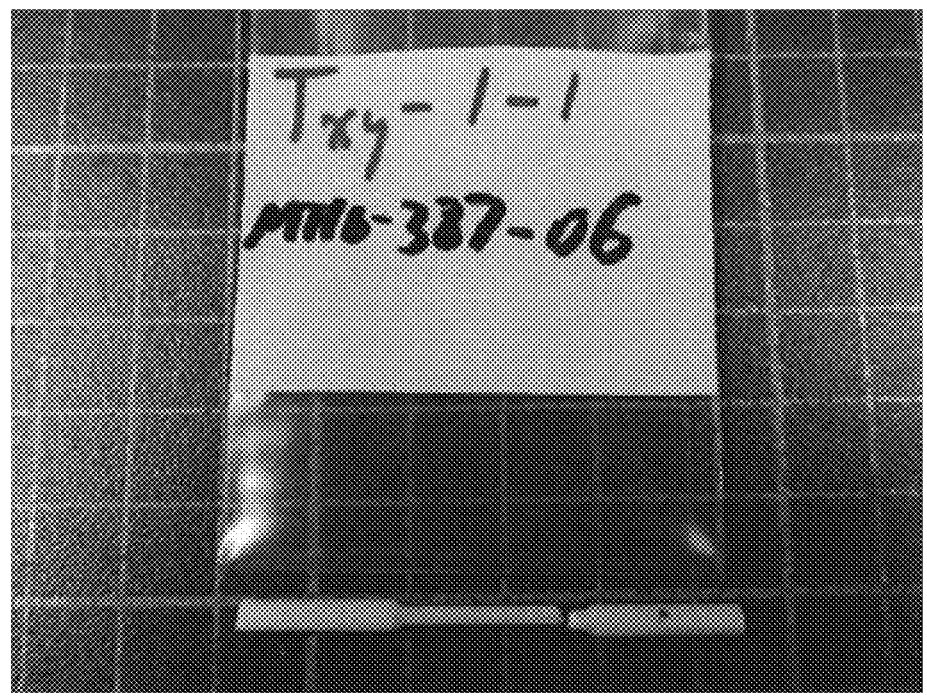
FIG. 4B shows the article of FIG. 4A, which has been subjected to a strain of between 15% and 16% strain (breaking strain) in the x-y direction.
Figure 5:
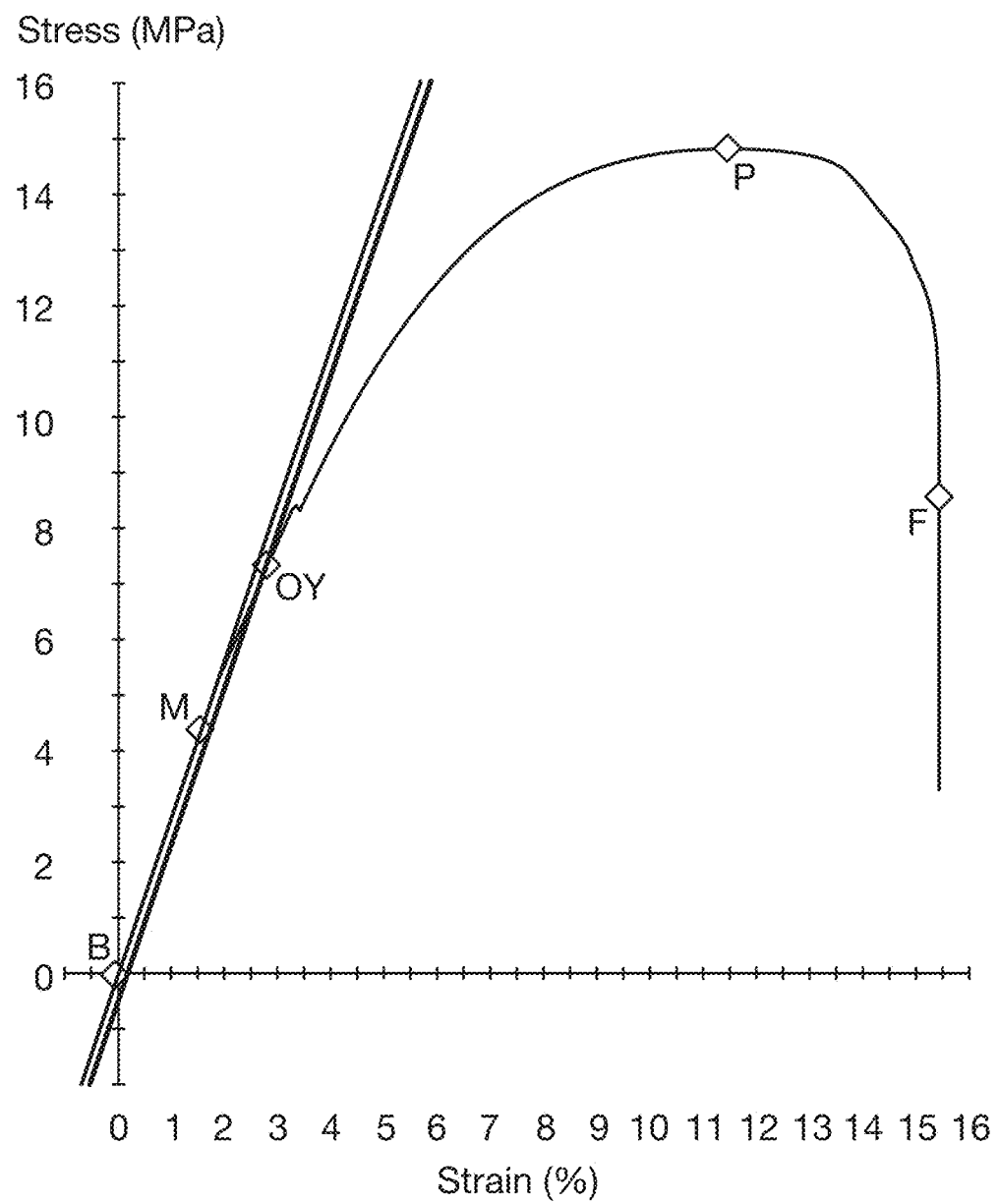
FIG. 5 shows the stress-strain curve of the article of FIG. 4A, where M is the proportionality limit; OY is the offset yield strength; P is the ultimate strength, reached at about 11.5% strain; and F is the break point, reached at a breaking strain of ~15% to ~16%.
Figure 6A:
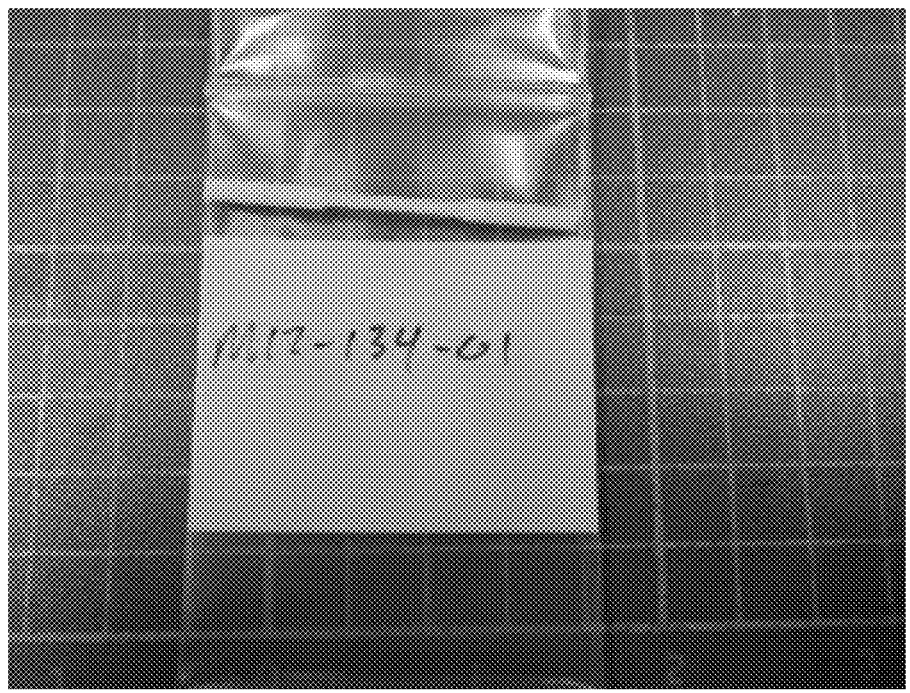
FIG. 6A shows a dogbone-shaped prepared by selective laser sintering of the milled polycaprolactone particles of FIG. 2.
Figure 6B:
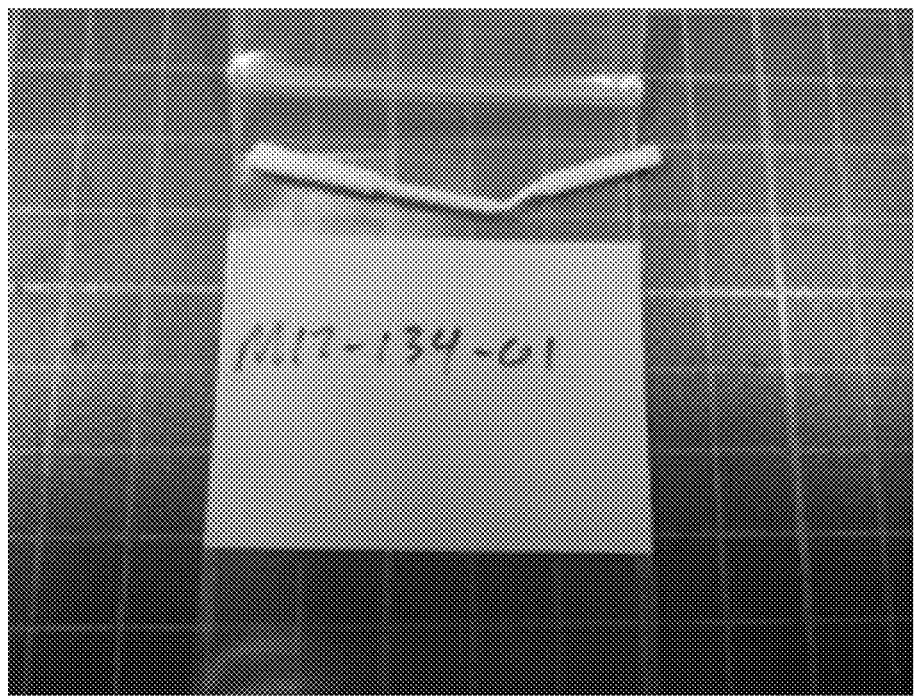
FIG. 6B shows the article of FIG. 6A, which has been subjected to a strain of about 55% strain in the x-y direction.

Behavior of a Laser Sintered Article Made with Conventional Particles Under Strain The dogbone-shaped article of Example 1 was subjected to a gradually increasing force P along the axis of the neck 2, as shown in FIG. 3B. The ratio of force P to initial area $A_o$ was recorded as stress σ; and strain, the increase in elongation of the neck, was recorded as a percent. The results are reported in Table 2, and plotted as a stress-strain curve in FIG. 5. As seen in Table 2, the article of Example 1 breaks under a stress of 8.6 MPa, corresponding to a force of 357.8 N. The elongation (strain) at ultimate strength is 11.1%. Based on values of stress and strain at proportionality limit M, the elastic modulus of the article of Example 1 is 280 MPa (4.2 MPa/0.015).

TABLE 2

Stress-Strain Data on a Laser Sintered Article Made with Conventional Particles.

| Critical Points | Stress (MPa) | Strain (%) |
| --- | --- | --- |
| Proportionality Limit M | 4.2 | 1.5 |
| Offset Yield Strength | 7.3 | 2.9 |
| Ultimate Strength | 14.9 | 11.1 |
| Break Point | 8.6 | 15.5 |

Example 3

Selective Laser Sintering with Asymmetrical Fibrous Particles

A dogbone-shaped article of FIG. 3A was prepared by selective laser sintering, using the asymmetrical fibrous polycaprolactone particles of FIG. 2, prepared by milling. Prior to milling, the poly(caprolactone) particles had a glass transition temperature (Tg) of −60° C., and a mean particle size of 60 microns. A first powder layer of asymmetrical fibrous polycaprolactone particles was deposited at a layer thickness of 100 microns, and sintered by scanning a laser over an area corresponding to a cross section of the designed cage structure, where the area is defined by an edge. A second layer of asymmetrical fibrous polycaprolactone particles was deposited and sintered by scanning the laser over an area corresponding to a second cross section of the cage structure; this process is completed until the complete dogbone-shaped article is formed.

Example 4

Figure 7:
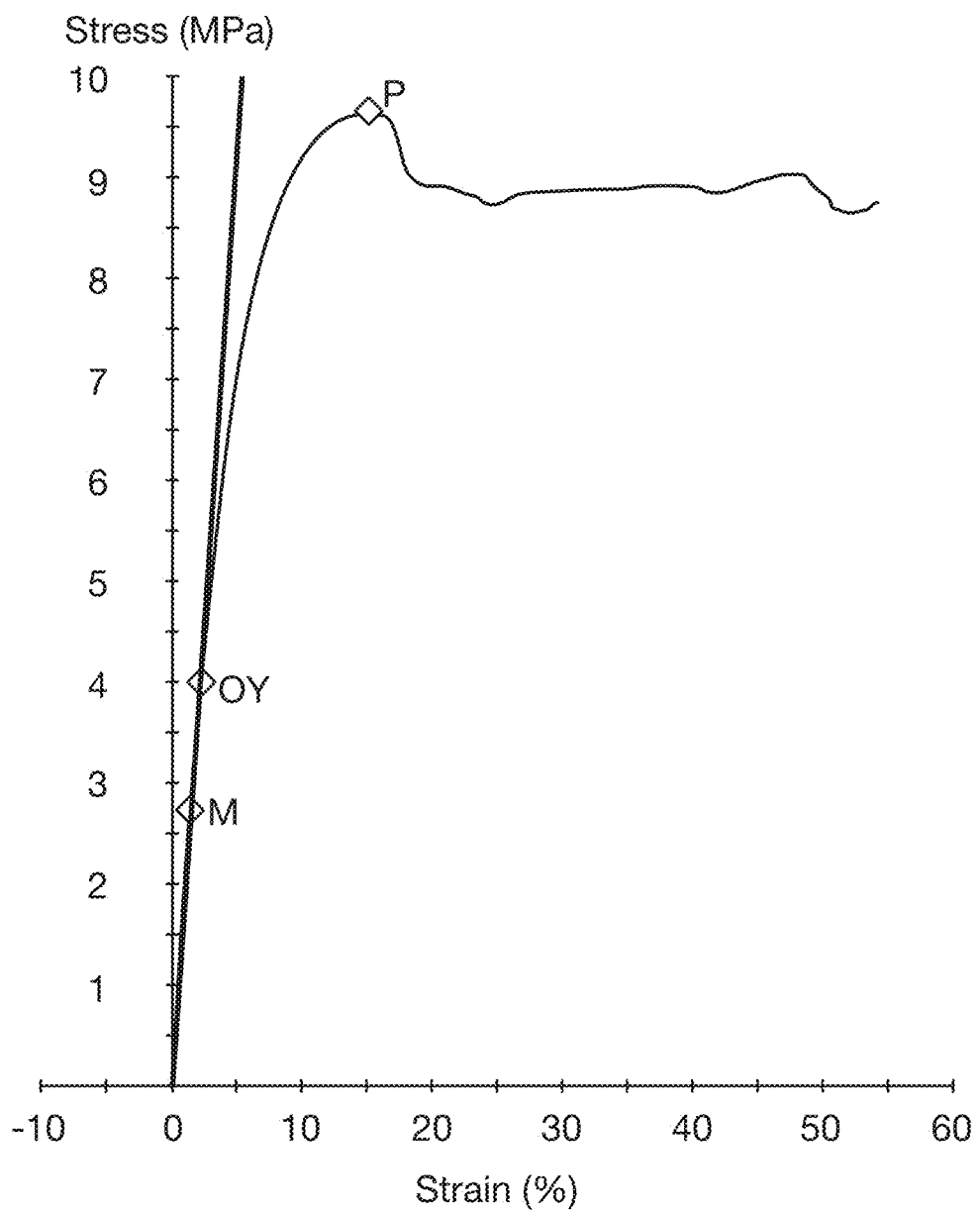
FIG. 7 shows the stress-strain curve of the article of FIG. 6A, where M is the proportionality limit; OY is the offset yield strength; and P is the ultimate strength, reached at about 14% strain. Necking was observed as strain increased from about 20% strain to 55% strain; the break point was not recorded.

Behavior of a Laser Sintered Article Made with Asymmetrical Fibrous Particles Under Strain The dogbone-shaped article of Example 3 was subjected to a gradually increasing force P along the axis of the neck 2, as shown in FIG. 3B. The ratio of force P to initial area $A_o$ was recorded as stress σ; and strain, the increase in elongation of the neck divided by the initial length was recorded, as a percent. The results are reported in Table 3, and plotted as a stress-strain curve in FIG. 7. As seen in FIG. 7, the article of Example 3 does not break under a strain of >50%. As the strain increases from 17% to 55%, the article of Example 3 elongates irreversibly, and the article undergoes necking. This necking occurs under a stress of ~9 MPa, corresponding to an applied force P of 374.4 N. The dogbone-shaped article of Example 3 has a reduced ultimate strength, when compared to the article of Example, seen by comparing the data in Tables 2 and 3. However, it has improved ductility and is less prone to breakage. Based on values of stress and strain at proportionality limit M, the elastic modulus of the article of Example 3 is 270 MPa (2.7 MPa/0.01).

TABLE 3

Stress-Strain Data on a Laser Sintered Article Made with Asymmetrical Fibrous Particles.

| Critical Points | Stress (MPa) | Strain (%) |
| --- | --- | --- |
| Proportionality Limit M | 2.7 | 1.0 |
| Offset Yield Strength | 4.0 | 2.5 |
| Ultimate Strength | 9.6 | 15 |

Where the article of Example 1 has an ultimate strength of 14.9 MPa, as shown in Table 2, articles prepared from asymmetric fibrous particles have an ultimate strength of ~10 MPa, as shown in Table 3. When multiple articles were prepared and tested, the ultimate strength was determined to be 10.1 MPa, with a standard deviation of 0.25 MPa. The elongation (strain) at ultimate strength was 15.0%, with a standard deviation of 1.47% compared to an elongation (strain) at ultimate strength of 11.1% for the article of Example 1, As shown in Table 2, the article of Example 1 has an elongation at break of 15%. Articles prepared from asymmetric fibrous particles have an improved elongation at break of 79.2%, with a minimum observed elongation at break of 22.3%, and a maximum observed elongation at break of 145%.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Further, various elements from the various embodiments may be combined to form other embodiments that are within the spirit and scope of the invention. Accordingly, the foregoing disclosure, description, and figures are for illustrative purposes only and do not in any way limit the invention, which is defined only by the claims.

What is claimed is:

1. A polymeric article of high ductility produced by rapid prototyping, the article comprising a plurality of layers of a fused thermoplastic powder, the thermoplastic powder comprising a majority of asymmetric fibrous particles,
    wherein each layer in the plurality of layers is characterized in that the asymmetric fibrous particles are preferentially oriented in a plane parallel to said each layer;
    wherein the polymeric article has a stress-strain curve such that ultimate strength is reached at a strain of 10% to 20%, and breaking stress is reached at >20% strain.

2. The polymeric article of claim 1, wherein the asymmetric fibrous particles are characterized by scanning electron microscopy.

3. The polymeric article of claim 1, wherein the asymmetric fibrous particles are characterized by particle size distribution.

4. The polymeric article of claim 1, wherein the asymmetric fibrous particles are characterized by a mean length L and a mean width W, wherein L>2 W.

5. The polymeric article of claim 1, wherein the thermoplastic powder is a thermoplastic polyester, a thermoplastic polyolefin, a polyamide, a polycarbonate, an acrylic polymer, or a styrenic block copolymer.

6. The polymeric article of claim 5, wherein the thermoplastic polyester is a polylactone, polyglycolic acid, or a polylactic acid.

7. The polymeric article of claim 5, wherein the thermoplastic polyolefin is a polymer or copolymer of ethylene, propylene, n-butylene, or isobutylene.

8. The polymeric article of claim 5, wherein the polyamide is polyamide 11, polyamide 12, polyamide 6, polyamide 4,6, polyamide 6,6, a copolymer thereof, or a mixture thereof.

9. The polymeric article of claim 1, wherein the polymeric article has a stress-strain curve such that ultimate strength is reached at a strain of 10% to 20%, and breaking stress is reached at >40% strain.

10. A method of creating the polymeric article of claim 1, comprising:
    a) depositing a first layer of thermoplastic powder comprising asymmetric fibrous particles, on a bed of a 3D printer, the asymmetric fibrous particles being preferentially oriented in a first plane parallel to the bed;
    b) fusing the thermoplastic powder with a laser in selected portions of the layer to produce an initial cross section of the polymeric article;
    c) depositing a further layer of the thermoplastic powder comprising the asymmetric fibrous particles on the first layer, the asymmetric fibrous particles in the further layer being preferentially oriented in a further plane parallel to the bed;
    d) fusing the asymmetric fibrous powder with a laser in selected portions of the further layer to produce a further cross section of the polymeric article, bonded with the initial cross section; and
    e) repeating step (c) and step (d) until the polymeric article is complete.

11. The method of claim 10, wherein the asymmetric fibrous particles are characterized by scanning electron microscopy.

12. The method of claim 10, wherein the asymmetric fibrous particles are characterized by particle size distribution.

13. The method of claim 10, wherein the thermoplastic powder is a thermoplastic polyester, a thermoplastic polyolefin, a thermoplastic polyurethane, a polycarbonate-based urethane, a cyanate ester resin, a polyamide, a polycarbonate, an acrylic polymer, or a styrenic block copolymer.

14. A polymeric article of high ductility produced by the method of claim 10,
    wherein the polymeric article has a stress-strain curve such that breaking stress is reached at >30% strain.

15. The polymeric article of claim 14, wherein the polymeric article is made out of a bioresorbable polymer.

16. A polymeric article of high ductility produced by the method of claim 10,
    wherein the polymeric article has a stress-strain curve such that breaking stress is reached at >40% strain.

17. The polymeric article of claim 1, wherein the asymmetric fibrous particles are characterized by a mean length L and a mean width W, wherein L>2 W.

18. A method of selective laser sintering, comprising:
    preparing asymmetric fibrous particles having a mean length L and a mean width W by either:
        a) subjecting thermoplastic polymer particles having a glass transition temperature Tg and a melting point Tm to a shear force, the subjecting being carried out at a temperature T, wherein Tg<T<Tm;
        wherein the shear force is sufficient to draw at least a portion of the thermoplastic polymer particles into the asymmetric fibrous particles; or
        b) preparing the asymmetric fibrous particles by electrospinning a solution of a polymer to produce nanofibers having a defined mean nanofiber length $L_1$, and, if the nanofiber length $L_1$>L, fracturing the nanofibers;
    depositing the asymmetric fibrous particles in a layer on a bed of a 3D printer so that the mean length L of the asymmetric fibrous particles is preferentially oriented in a first plane parallel to the bed; and
    fusing a selected portion of the asymmetric fibrous particles in the layer to form a first bonded network of the asymmetric fibrous particles.

19. The method of claim 18, wherein subjecting the thermoplastic polymer particles to the shear force comprises milling the thermoplastic polymer particles.

20. The method of claim 18, wherein subjecting the thermoplastic polymer particles to the shear force comprises milling the thermoplastic polymer particles with a three roll mill, a rotor/stator mill, a pin mill, a jet mill, or a hammer mill.

21. The method of claim 18, further comprising:
    depositing a further layer of thermoplastic particles above the bonded network of the asymmetric fibrous particles; and
    bonding a selected portion of the thermoplastic particles in the further layer by selective layer sintering.

22. The method of claim 21, wherein the thermoplastic particles in the further layer comprise the asymmetric fibrous particles, the bonding comprising fusing the asymmetric fibrous particles in the further layer to form a further bonded network, the mean length L of the asymmetric fibrous particles in the further bonded network being preferentially oriented in a second plane parallel to the bed of the 3D printer.

23. The method of claim 22, wherein the first bonded network and the further bonded network are each generally two-dimensional networks.

* * * * *